United States Patent Office 3,353,614
Patented Nov. 21, 1967

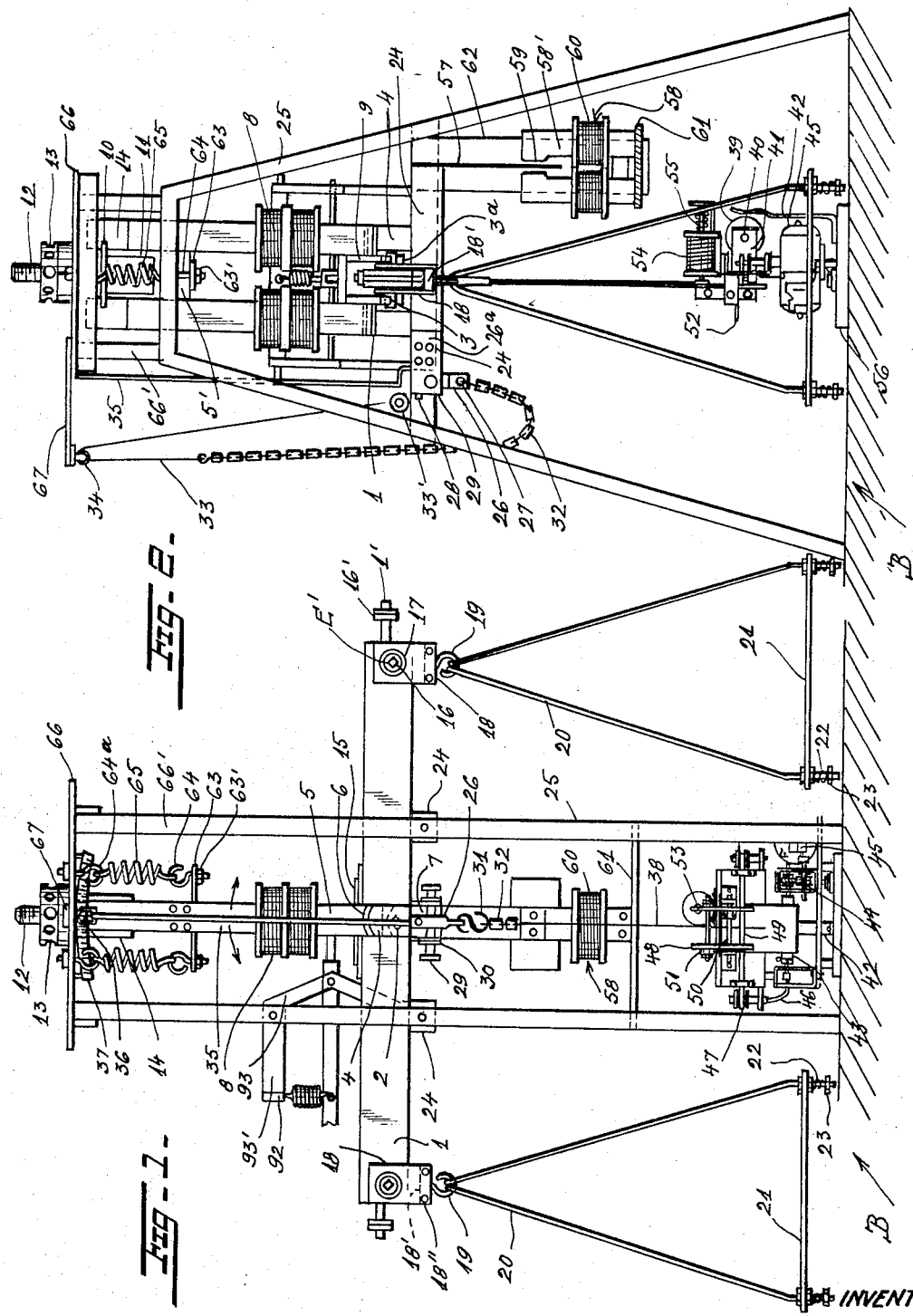

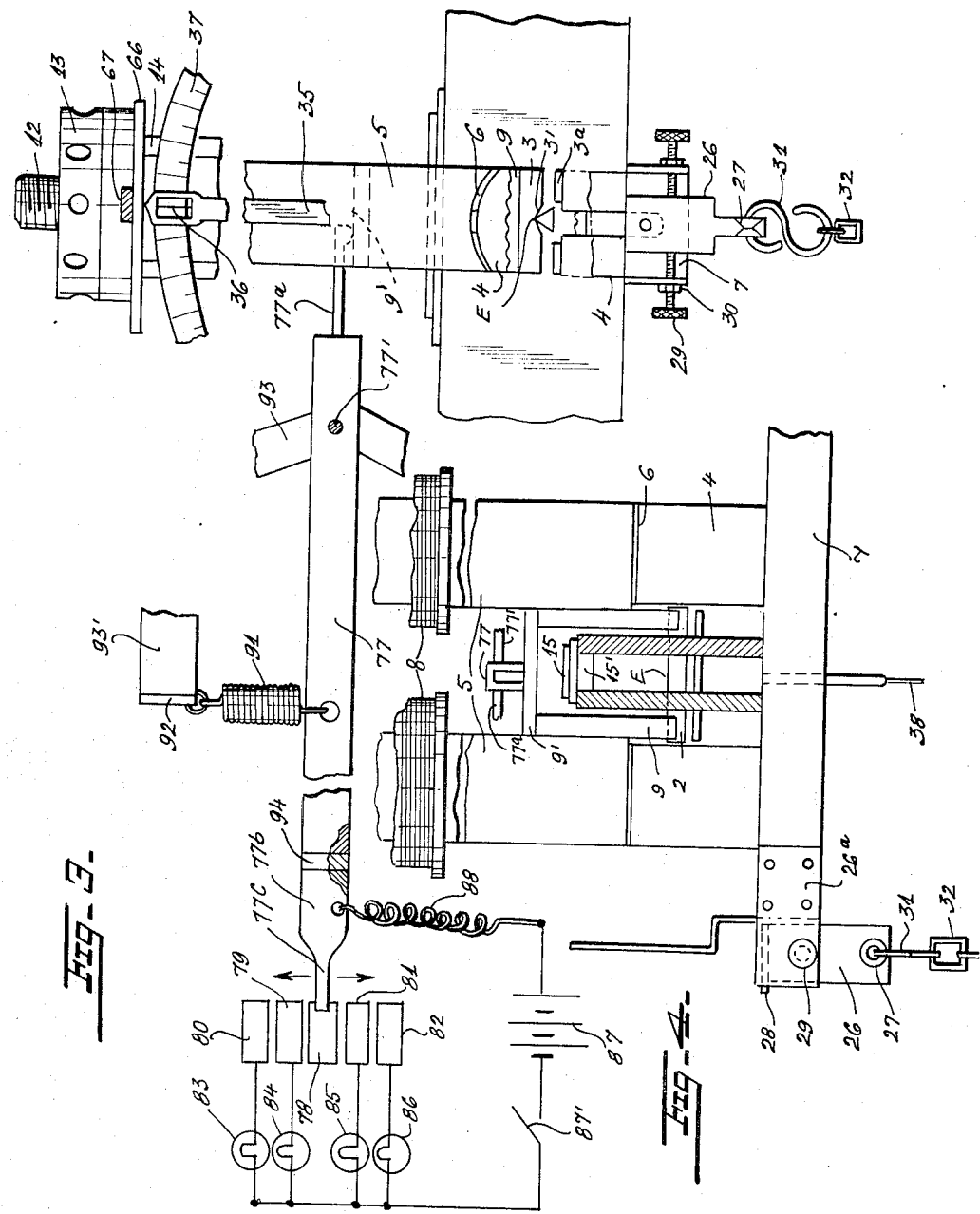

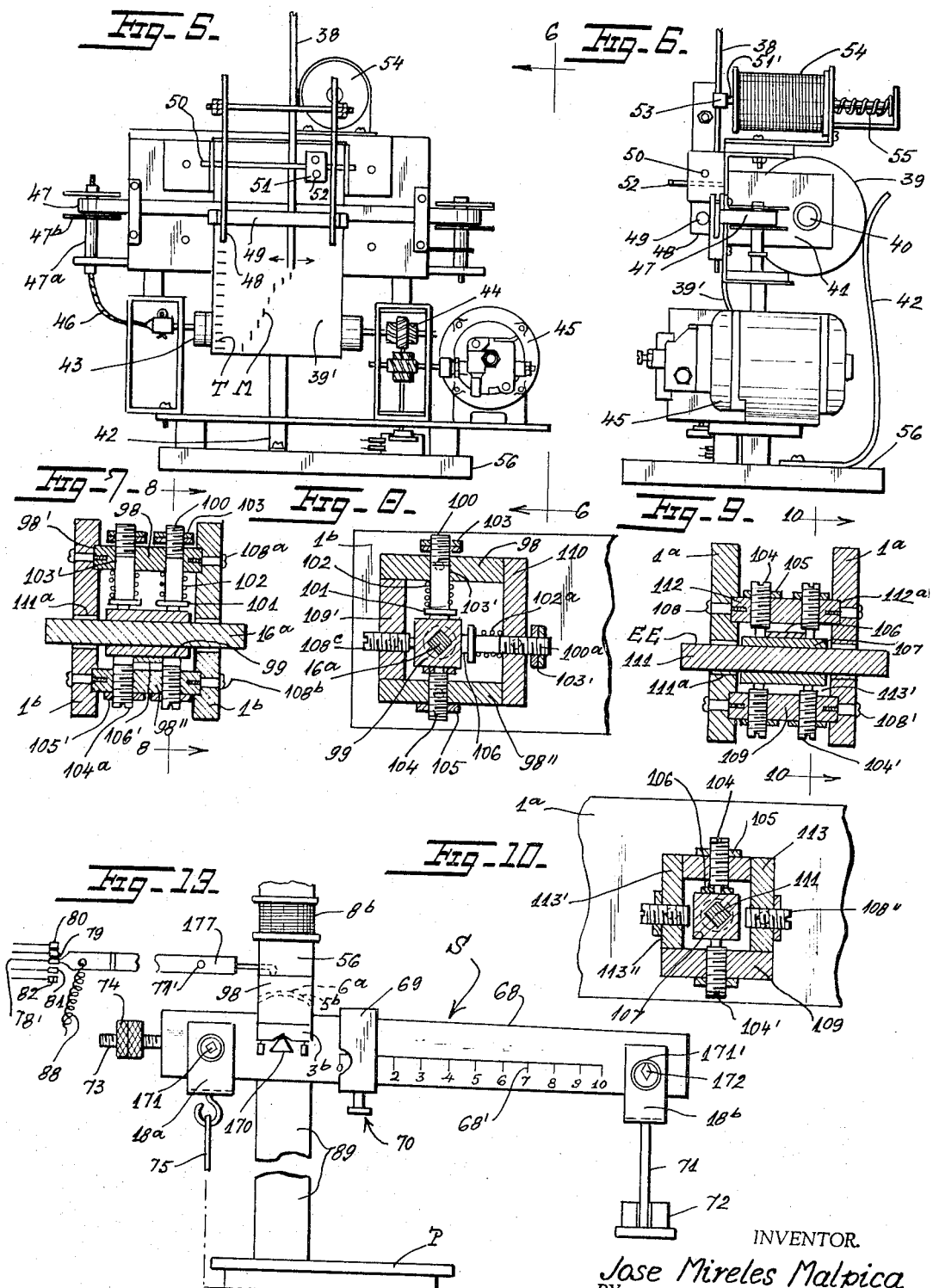

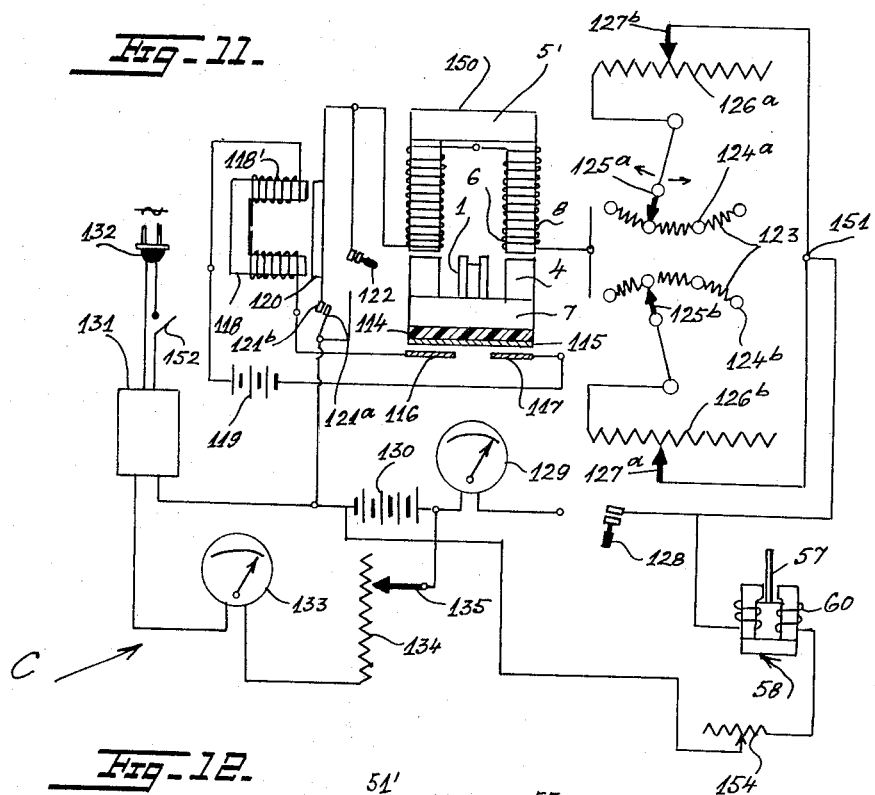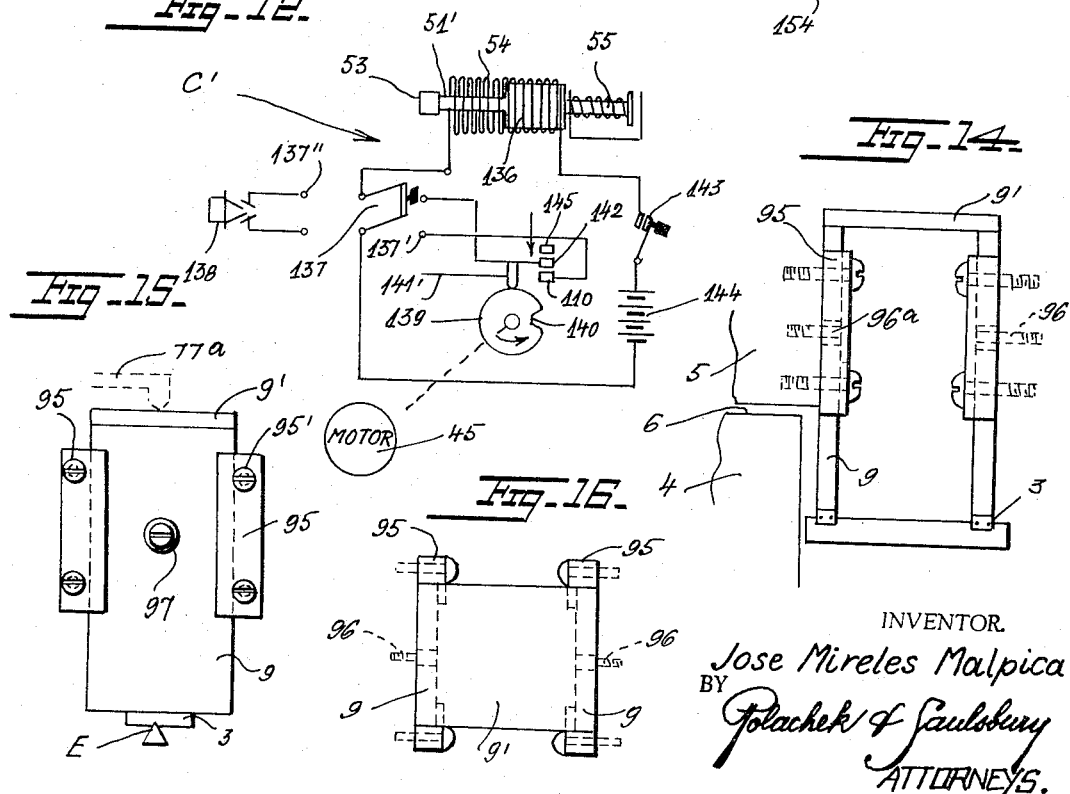

3,353,614
SENSITIVE RECORDING BALANCE AND SCALE FOR WEIGHING HEAVY LOADS
José Mireles Malpica, Montes Urales 355A, Mexico City 10, Mexico
Filed Oct. 2, 1964, Ser. No. 401,132
17 Claims. (Cl. 177—201)

ABSTRACT OF THE DISCLOSURE

A recording balance and scale for weighing heavy loads continuously and with an accuracy of great magnitude including a balance beam and a knife edge at a balancing position on the beam, with magnetic means for substantially relieving the knife edge of the weight of the beam and load. Means is also disclosed for indicating the extent of contact pressure between the bearing means and knife edge and means to change the sensitiveness of the balance even while loaded is also shown.

This invention concerns an extremely sensitive recording balance and scale for weighing heavy loads.

Heretofore precision balances have been limited in use to weighing very light loads, such as chemicals, precious stones, gold jewelry and the like. It has not been found possible or practicable to weigh a heavy load ranging from a pound up to several hundred pounds, with a precision of one part per million or better, by use of a beam balance. It has also been found impossible to use a precision beam balance to weigh a heavy article continuously, because a heavy weight distorts the beam, flattens and dulls the fine edges of balance knives and pivots, and quickly ruins the sensitiveness and accuracy of the balance.

The present invention overcomes the above and other difficulties and disadvantages in precision beam balances, and in addition makes possible for the first time, a beam balance which can be used to weigh heavy articles, which can be used to weigh a heavy article continuously, which can be used to weigh heavy articles with a precision of one part per million or better and which can be used to record minute changes in weight of a heavy article being weighed continuously over an extended period of time.

According to the invention there is provided a balance or scale which has a horizontal beam in which is mounted a central knife with its edge turned upwardly. At opposite ends of the beam are other knives having upwardly turned edges. From the end knives are suspended weighing pans, one to receive an article or load being weighed and the other being used to carry a comparison or standard weight or weights. The beam is centrally supported by pole pieces of an electromagnet in such a way that the edge of the central knife encounters almost no pressure against it. The entire weight of the beam, pans, load being weighed and the standard weights are all supported by pole pieces of the electromagnet and in turn the pole pieces are supported by the frame of balance. Thus the pressure to which the central knife edge is generally subjected in conventional precision balances is not encountered in the present invention. One pole piece under the beam carries a vertical indicating needle which is movable laterally in front of a stationary scale to indicate a change in weight of an article being weighed. The article can be weighed continuously for long periods of time to measure small variations of weight with time. In addition the balance is provided with a recording system for making a continuous graphic record of weight and changes, if any, in weight of an article being weighed over an extended period of time. As examples of the precision with which the present invention can operate, it is possible to weigh a pan containing several gallons of water, and obtain a graphic record of loss in weight due to evaporation of water from the pan over a period of several days, weeks, or longer. It is possible to weigh animals or human beings with a precision of one part per million or better, and to obtain a record of change in weight due to normal body processes, such as breathing, evaporation of perspiration, etc. over a period of several hours or longer, with the same precision.

It is therefore a principal object of the invention to provide balance or scale for weighing heavy loads with an accuracy of one part per million or better.

Another object is to provide a precision beam balance or scale for weighing a heavy load continuously.

A further object is to provide a precision beam balance or scale with means for recording continuously the weight and changes in weight of a heavy load being weighed continuously.

Other objects are to provide a beam balance or scale in which a central knife edge is relieved of the load being weighed; in which the beam carries a movable chain to change the center of mass to compensate the change in sensitiveness due to warping of the beam by a heavy load; in which a novel recording system is used to make a graphic record of weight of a load being weighed continuously; in which an indicating needle provides a display of balance and unbalance with respect to fixed graduated scale; in which an electromagnet supports the beam, load being weighed, and weighing pans or platform supporting the load; in which visual indications and signals are provided of correct and incorrect pressure imposed upon the knife edge.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1 is a front elevational view of a precision balance embodying the invention.

FIG. 2 is a side elevational view of the balance.

FIG. 3 is an enlarged fragmentary front view of the balance, partially schematic in form, and with parts broken away, similar to a portion of FIG. 1.

FIG. 4 is an enlarged fragmentary side view of the balance, similar to a portion of FIG. 2.

FIG. 5 is an enlarged front view of recording apparatus similar to a portion FIG. 1.

FIG. 6 is a side view of the recording apparatus taken on line 6—6 of FIG. 5, similar to a portion of FIG. 2, but on an enlarged scale.

FIG. 7 is an enlarged sectional view of a knife mounting arrangement.

FIG. 8 is a sectional view taken on line 8—8 of FIG. 7.

FIG. 9 is an enlarged sectional view of another knife mounting arrangement.

FIG. 10 is a sectional view taken on line 10—10 of FIG. 9.

FIG. 11 is a diagram of an electric circuit used in operating the balance.

FIG. 12 is a diagram of an electric circuit used in operating the recording apparatus or system.

FIG. 13 is a front view of part of a weighing scale embodying a modification of the invention.

FIGS. 14, 15 and 16 are respectively front, side and top views of the fulcrum assembly.

Referring first to FIGS. 1–4 the precision balance B shown therein has a beam 1 consisting of two parallel bars or plates, preferably made of non-magnetic metal. Extending through the bars of the beam transversely thereto is a central knife 2. This knife is triangular or square in cross section and is held securely in the plates. A preferred way of anchoring the knife is by heating the plates of the beam, then inserting the knife in aligned triangular or square holes in the plates and allowing the plates to cool, so that the knife is held by thermal compression of the plates. Edge E of the knife faces upwardly and is perpendicular to the vertical central plane of horizontal beam. Two additional knives 16 are secured to the beam by thermal compression at opposite ends of the plates of the beam. The end knives have bearing edges E′ facing upwardly. The three knife edges E, E′ are all disposed transversely of the beam in the same horizontal, longitudinal plane of the beam. The beam plates should be made of material which is sufficiently rigid to support the maximum loads to which it will be subjected without material deflection or bending exceeding very close tolerances. The beam has a sufficient length to provide space for carrying horizontal weighing pans 21 suitably spaced apart from each other. At both ends of the beam are screws 1′ inserted in ends of one of the beam plates. These screws carry balancing nuts 16′ which can be turned on the screws for fine adjustment of balance of the beam. The axes of the screws are aligned with the plane of the knife edges E, E′.

Underneath the beam 1 is a magnetic bar 7 which serves as a lower part of the magnetic path or circuit of the balance. This bar is rigidly secured to the plates of the beam. At one end of the bar 7 which extends transversely of the beam at its center is a screw 28 which holds the lower end of a needle 35 in an upright position. A pair of plates 26a at this end of bar 7 have a plate 26 inserted between them. This plate has a hole 27 formed therein. The rim of the hole is wedge shaped to define an annular knife edge which supports an S-hook 31. A chain 32 is attached at one end to the hook 31. The upper end of the chain is attached to a cord 33 passing over a pulley 34 carried by a supporting arm 67. The lower end of the cord is tied to terminates at a wind-up reel 33′ carried by a horizontal frame bar 24. Screws 29 extending through opposing plates 26a serve for adjusting the position of plate 26. Nuts 30 serve to lock the screws 29 in final positions.

At opposite ends of beam 1 are stirrups 18 made of plates of non-magnetic material. In these plates are hollow cylinders 17 made of hard bearing material. The ends of knives 16 are disposed in cylinders 17 with upwardly turned edges E′ facing the upper inner sides of the cylinders. The knives 16 are rectangular in cross section. Maximum strength of the knives is in their vertical planes intersecting upper and lower edges of the knives. Stirrups 18 have bottom plates 18′ which may be set into lateral grooves at inner sides of the stirrup plates and secured by screws 18″. The bottom plate 18′ of each stirrup holds a ring 19 from which hang four bars or rods 20.

Lower ends of bars 20 extend through corners of the rectangular pans 21. The lower ends of the bars are threaded and nuts 23 are engaged on them. Coil springs 22 are interposed between nuts 23 and the underside of each pan to distribute the load to be placed on each pan. The springs 22 should be made of non-magnetic material.

The magnetic circuit of the balance includes two upright iron pole pieces 4. The pole pieces 4 are secured to bar 7 forwardly and rearwardly of the beam 1 with the beam centered between them. The pole pieces are mad of "soft" iron and are readily magnetized when the balance is in operation. The upper ends 4a of the pole pieces 4 are cylindrically curved. Their axes of curvature coincide with the edge E of the central knife. The magnetic circuit includes two upright soft iron pole pieces 5 spaced slightly apart from pole pieces 4 by arcuate air gaps 6. A horizontal soft iron bar 5′ joins upper portions of bars 5. The pole pieces 4, 5 and horizontal bars 5′, 7 thus define a closed rectangular magnetic circuit including and traversing the air gaps 6. On each of the pole pieces 5 is a coil 8. The coils are connected in a magnetizing circuit as will be explained in connection with FIG. 11. When the coils are energized the magnetic circuit is magnetized so that pole pieces 4 are attracted and pulled upwardly toward pole pieces 5″. If the center of mass of pole pieces 5 and bar 7 is too far below knife 2, balancing plates 15 are secured to the top of beam 1.

Secured to pole pieces 5 are plates 9 joined by a cross plate 9′. At the bottom ends of plates 9 are hardened bearing plates 3 each having a downwardly facing V-cut or notch 3′ in which seats knife edge E. Normally, when the balance B is not in operation, edge E is spaced from the apical points of the V-cut and beam 1 rests on horizontal frame bars 24. When the balance is in operation, then edge E lightly contacts the apical points of the V-cuts. A cross bar 3a extends through the beam plates just below opposite ends of the bottom of plates 3 to serve as a stop member and cause the knife 2 to separate from the apex of V-cuts 3′ if the beam is loaded excessively on one end or the other.

At the underside of horizontal bar 5′ is a horizontal plate 63 supported at its ends by nuts 63′ engaged at the lower threaded ends of hooks 64. The hooks are suspended by axially vertical springs 65 secured at their upper ends to hooks 64a carried by a plate 66. Plate 66 is supported by frame bars 66′ at opposite ends of inverted, generally U-shaped frame members 25. At the top of plate 66 is an adjustable nut 13 engaged on axially vertical screw 12. The head 11 of the screw bears upwardly on the underside of a cross plate 10 secured at opposite ends in grooves at inner sides of pole pieces 5. The pole pieces can move between guide plates 14 carried by plate 66. By the arrangement described the springs 66 can yield to take up any force of contact between the knife edge E and the contact plates 3 when the entire electromagnet is lowered for adjustment by turning nut 13 on screw 12.

Plates 9, joined together by plate 9′, move along guide 95, held by screws 95′ to pole pieces 5. There are lower and upper limits to the freedom of movement of the assembly, obtained by screws 96 to pole pieces 5. The cylindrical part of the screws 96 passes through slightly larger holes 97, made on plates 9. The difference in diameter between the cylindrical upper part 96a of screws 96 and the diameter of the holes 97, is the variation allowed to the air gap 6, which by the action of the lever 77, and the spring 91, constitutes a dynamometer which controls the force against plates 3. The drawing given or part of it may replace FIGURE 4A″.

Plates 9 touch pole pieces 5 where they are guided and where the stops are held, but do not touch the movable pole pieces 4. Only plates 3 bear the small upward pressure of the knife edge E of knife 2. The upward pull of spring 91, which due to axis 77′, results in a downward push of assembly of parts 9, 9′ and 3, which added to its weight, is sufficient to maintain contact between knife edge E and plates 3.

It must be pointed out that the only contact between the moving system and the fixed part of the balance, occurs at the line of contact between the knife edge E of knife 2 and plates 3, supported by plates 9.

In order to prevent excessive oscillation of the beam when in use, there is provided a magnetic damping system. This system includes a non-magnetic plate 57 made of aluminum, copper or the like. The plate is attached to the rear end of bar 7 as viewed in FIG. 2. The plate 57 is disposed in an air gap 59 defined between opposing pole faces of pole pieces 58′ in a damping electromagnet 58. This electromagnet is supported by a plate 61 carried by vertical plates 62 suspended from frame bars 24. The frame bars 24 are stationary and are secured to the frame members 25. On the pole pieces 58′ are coils 60 energized by a suitable direct current source described in connection with FIG. 11. When the electromagnet is energized, freedom of movement of plate 57 in the air gap 59 is restrained due to the magnetic field opposing magnetic fields set up by eddy currents in plate 57 when the plate tends to oscillate with beam 1. Thus oscillations of the beam are damped. If desired a permanent magnet may be employed to provide fixed magnetic damping and variable strength electromagnet 58 may be provided to supplement the permanent magnet.

In order to provide an indication of the force of contact between the central knife edge E and the knife rest plates 3, there is provided a lever 77 pivotally mounted on a shaft 77′ near one end 77″. From this end of the lever extends a finger 77a whose tip contacts the top of cross plate 9′ on plates 9. Shaft 77′ is supported by bars 93 connected to frame members 25. A coil spring 91 is supported at its upper end by a bar 92 joined by support bars 93′ which are extensions of bars 93. The bars 93, 93′ are supported by frame members 25 and frame bars 24. At its other end 77b lever 77 has an insulator 94 spacing its other end 77b from the remainder of the lever. A contact finger 77c is formed at lever end 77b. This contact can contact and press four stationary contacts 79–82. The lever serves as a mechanical amplifier since it is pivoted near its end 77″. Connected in circuit with contacts 79–82 are four lamps 83–86 respectively. The lamps are connected in parallel to a battery 87 which has a return circuit through switch 87′ and flexible coiled wire 88 to lever end 77b. When the lever is horizontal and knife edge E is properly in contact with bearing or rest plates 3, then finger 77c with contact 78 is at center and no lamps are lighted. If the knife edge rests less heavily on the plates 3, then upper lamp 84 lights as contacts 78, 84 close. If the knife edge is further separated from plates 3, then uppermost lamp 80 lights as contacts 79 and 80 also close. If the knife edge is pressed more against plates 3, lamp 85 will light. If greater force is applied to the knife edge, lamp 86 will also light. The operator of the balance can take remedial steps to relieve the excess pressure or increase the force of contact by proper adjustment of the circuit through which the coils 8 of the electromagnetic circiut are energized. The lighting of either of inner lamps 84, 85 or the lighting of no lamp is an indication that current in a proper range is passing through coils 8. If lamp 83 or lamp 86 lights, then too small or too great a current is passing through the coils. The circuits including can be connected to automatic regulators to control the current passing through coils 8 or the current regulation can be done by manual control.

It will be understood that the beam 1 rests on bars 24 while the pans 21 are being loaded with a load to be weighed and with a known standard or comparison weight. Then when the coils 8 are energized the magnetic circuit completed and pole pieces 4 are drawn to pole pieces 5. The air gaps 6 are maintained within certain tolerances. The rising of the pole pieces with cross bar 7, draws the entire load including the loaded pans, beam, pole pieces 4 and cross bar 7 upwardly until knife edge properly contacts the apices of V-cuts 3′ in rest plates 3. In making the proper adjustment of contact between the knife edge and rest plates, to insure that the knife edge does not strike the rest plates with excessive force, there is provided a control circuit C shown in FIG. 11 to which reference is now made.

Electromagnet 150 includes the pole pieces 5, cross piece 5′, coils 8, pole pieces 4 and cross bar 7. Connected to coil 8 is a double rheostat 123 having spaced taps 124a, 124b respectively. Movable contacts 125a, 125b can be moved to the several taps for coarse adjustment of current passing through series connected coils 8. Fine adjustment of current is obtained by continuously variable resistors or rheostats 126a, 126b having adjustment taps 127a, 127b. Central terminal 151 is connected to a manually operable switch 128 connected via a current meter or ammeter 129 to battery 130. In order to charge the battery there is provided a rectifier 131 connected via a switch 152, ammeter 133 and vairable resistor 134 to one terminal of battery 130. The other terminal of battery 130 is connected to the rectifier. The rectifier is connected to an alternating current supply via a plug 132 and switch 152.

The main current passing through coils 8 returns to the battery via normally closed contacts 121a, 121b of a relay 118. This relay has an armature 120 which operates contact 121b. A manually operable switch 122 is provided to short circuit contacts 121a, 121b and to deactivate relay 118 in the circuit. When switch 122 is closed, coil 118′ of the relay 118 is connected to a metal electrode 116 spaced from electrode 117 and from a metal plate 115 carried by insulator 114 under cross bar 7.

In use of circuit C for adjustment purposes, switch 128 is opened. Screw 12 is lowered to lower poles 5 until plates 3 contact knife edge E. Then switch 122 and switch 128 are closed to deactivate relay 118 and energize coils 8. This completes the magnetic circuit and pole pieces 4 with cross bar 7 and beam 1 are raised magnetically. Contact is broken between electrodes 116, 117 and plate 115. Relay 118 is deenergized and contacts 121a, 121b close. Switch 122 is then manually opened. The circuit for coils 8 is completed through contacts 121a, 121b. Magnitude of current is indicated by meter 129. If the moving system including beam 1 should accidentally be depressed, plate 115 will contact electrodes 116 to 117 and relay 118 will be energized to open contacts 121a, 121b and open the energizing circuit of coils 8. If the coils 8 were not deenergized, then when the applied force depressing beam 1 would be released, the knife edge E would strike the plates 3 with a damaging impact. Thus the knife edge is guarded against accidental damage upon depression and release of the beam while the magnetic circuit is energized.

It is necessary to adjust the system so that the magnetic pull upwards on the pole pieces 4 is just sufficient to make light contact between the knife edge and plates 3. This pull should be just a little greater than the total weight of the moving parts of the balance including the beam 1 and loaded pans. The lamps 83–86 are used as indicators of correct pressure between the knife edge and plates 3. They also serve to indicate proper magnitude of current passing through coils 8. Any necessary adjustments of current are made by adjusting the coarse rheostats 123 one at a time and/or fine rheostats 126a, 126b so that neither of lamps 83, 86 light and preferably, no lamp lights. During this current adjustment, the current continues through coils 8 uninterruptedly and relay 118 is ready to deenergize the magnetic circuit if beam 1 is accidentally depressed during the adjustment operation. The rectifier circuit can be used to keep the battery 130 in a charged condition.

In circuit C, coils 60 of electromagnet 58 used to create an oscillation damping field for plate 57 may be connected to battery 130 via a rheostat 154. Alternatively, a separate battery can be used. If desired electrode plates 116 and 117 can be connected in series with battery 130 and battery 119 can then be omitted.

The invention is applicable to many new applications in the biological, physical, physical-chemical, and other technological chemical fields, and makes it possible to detect minute variations in mass of the order of one or more parts per million which becomes appreciable and noticeable with passage of time. In order to record these variations in mass as they occur, the balance includes recording apparatus adapted for this purpose shown in FIGS. 1, 2, 5 and 6. The system includes a needle 38 which hangs vertically from bar 7. The needle is centrally located with respect to the bar 7 and beam 1, to which bar 7 is rigidly secured. Needle 38 normally moves freely laterally between a pressing bar 49 and a carbon ribbon 47 like a typewriter ribbon. Bar 48 pivots on a pin or shaft 50. The bar 48 is attached by tip 53 of a plunger 51′ in solenoid 54. The plunger is retracted by a spring 55. When the solenoid is energized it tilts the upper end of bar 48 outwardly and the lower end of bar 48 carrying a pressing bar 49 moves inwardly toward ribbon 47. The cylinder presses needle 38 against the ribbon which then produces a mark on the depending end 39' of paper fed from roll. The paper roll is carried on a shaft 40 held by plate 41. Shaft 40 can be withdrawn to replace the roll of paper. A lower roller 43 serves to take up marked paper. The roller 43 is driven by a motor 45 via speed reducing gearing 44. The ribbon 47 is driven in coordination with paper travel by a flexible cable 46 connected via shaft 47a to reel 47b. A light spring 42 keeps the paper taut by preventing too free rotation of roll 39. An accessory timer-marker may be provided for marking the paper periodically with marks T indicating elapsed time intervals. The marks M indicating change in weight of a load appear on paper 39' as short strokes as indicated in FIG. 5.

FIG. 12 shows schematically circuit C' of the recording system. A battery 144 is connected in series with a manually operable switch 143 and solenoid 54 when double-pole double-throw switch 137 is closed with contacts 137'. Motor 45 drives timing disk 139 which has a notch 140 into which bar 141 can enter once during each revolution of the disk 139. When bar 141' enters notch 140 contact 142 closes with fixed contact 110. This closes the electrical circuit which energizes solenoid 54 driving the magnetic slug 136 to the left as viewed in FIG. 12 and advancing plunger 51'. Spring 55 retracts the plunger when the solenoid is deenergized after notch 140 passes bar 141. By this arrangement a periodic marking of the paper 139' by needle or stylus 38 occurs. If switch 137 is set to its left position to close with contacts 137" then pushbutton switch 138 can be manually operated to close the circuit of solenoid 54 and obtain marking of the paper independently of the timer.

Before a record is made of changes in weight of a load by means of the recording system, it is advisable to adjust the sensitivity of the balance. This is done by raising or lowering chain 32. Also the current of the damping electromagnet 58 should be adjusted according to load to be weighed. A chart can be made up to be used as a guide for various settings of rheostat 154 for different loads to obtain critical damping of oscillations of the beam 1.

Once the above adjustments have been made, manually operable pen 52 supported by plate 51 on shaft 50 as shown in FIGS. 5 and 6 can be advanced to record a calibration of the sensitivity of the balance. To perform this calibration the recording mechanism is started and pen 52 is applied to the paper to make a reference mark. The needle 38 will be centered and in a few seconds will make a mark automatically indicating a balanced condition of the beam with needle 38 vertical. Then without stopping the recording mechanism a small load of sand or small shot amounting to about 100 milligrams is loaded in one pan 21. Needle 38 will cause a mark to be made to one side of the original no-load mark. Then another 100 milligrams load is added to the first 100 milligrams to obtain a second lateral mark on the paper. This is repeated to obtain successive marks spaced apart both laterally and longitudinally of the paper, forming a discontinuous slanted line.

By placing known weights in the other pan, larger different weights can be placed in the weighing pan to obtain another discontinuous line constituting another series of calibrating marks for larger weight variations. By this method the single narrow width of recording paper can be used to record different ranges of weight changes. Subsequently the recording mechanism can be used for recording weight variations of a load placed in the weighing pan, balanced of course by a non-varying weight in the standard weight pan. The recorded marks on the paper can be read against the calibrated marks to indicate the absolute magnitude of the weight variations of the weighed load. When a weight variation record has been completed the paper can be cut and removed from the recording mechanism. It is desirable that suitable supports be placed under the pans to stabilize them when weights or loads are being added or removed. The supports will be removed during the weighing of the loads. The scale 37 and needle 35 indicate the balance of the weight of a load in a pan 21 by a known weight in the other pan, when the needle is at "0" on the scale. Scale 37 can be a straight or curved scale.

Instead of knife 2 which is triangular in cross section, it is possible to use a knife which is rectangular in cross section mounted as shown in FIGS. 9 and 10. The rectangular knife 111 is secured by in a block 107 by thermal compression. The block has a square cross section. The opposite ends of the knife extend outwardly through holes 111a in the beam plates 1a. On the block 107 is a plate 106 which serves to hold the block in place. Two screws 104 are screwed into an upper plate 112 secured in grooves 112a of plates 1a by screws 108. These screws bear down on the upper side of block 107 with plate 106 disposed between them. Two similar screws 104' bear on the underside of the block. These screws are screwed into a bottom plate 109 held in beam plates 1a by screws 108'. Further screws 108" are screwed into lateral vertical plates 113, 113' seated in grooves 113" at inner sides of plates 1a. Nuts 105 are screwed on the several screws and lock them in place. Thus the rectangular knife with its sharp diagonal edge EE facing upwardly, is secured in the beam plates. Edge EE will be disposed in the V-cuts in the bearing or rest plates 3.

In FIGS. 7 and 8 is shown another arrangement of knife supports which can be used for either the central knife or the end knives in the beam. As shown in FIGS. 7 and 8, a knife 16a having a rectangular cross section is secured in rectangular block 99 by thermal compression. Cylindrical rods 100 having flanges 101 on which bear springs 102 press the rods down on the upper side of the block 99.

The upper ends of the springs bear on the underside of a horizontal plate 98 seated in grooves 98' in beam plates 1b. The plate 98 is held by screws 108a in the beam plates. Nuts 103 on upper threaded ends of the rods hold the rods in place. The rods are slidably mounted in holes 103' in plate 98. A plate 106' at the underside of the block holds it in place between the beam plates. Plate 106' in turn in held by screws 104a at the underside of the block. The screws are seated in a bottom plate 98" held by screws 108b to the beam plates. Nuts 105' lock the screws 104a in place. Other screws 108c in plate 109' bear on the left side of block 99 as viewed in FIG. 8. At the right side of the block are rods 100a urged against the block by springs 102a. The rods are slidably disposed in plate 110 secured to the beam plates along with parallel plate 109'. Nuts 103' on the threaded ends of the rods hold them in the plate 110.

The screws 104, 104', 104" enable adjustment of the position of knife 111 in holes 111a of the beam plates 1a. Similarly the screws 104a, 108c enable positioning of knife 16a in the hole 111a' of plates 1b. The double nuts 103, 103' serve as stop elements. Strong springs 102, 102a should be used to insure firm positioning of the knife 16a. Knife edge EE' of knife 16a faces upwardly and will be so disposed if used in beam plates 1 in place of knife 16.

It is important to note that in the present invention, the applied load does not tend to flatten the critical edge E of knife 2. Balance B then approaches the characteristics of an ideal balance, since the sensitiveness of the balance determined by the sharpness of the knife edge is independent of the load on the balance.

In order to maintain the same response of the balance B to different loads, it is desirable to raise or lower the center of mass of the moving system depending on the load, by raising or lowering the chain 32. The cord 33 is pulled and tied at 33'. The screws 29 holding plate 26 to which the end of chain 32 is attached can be adjusted so that the annular knife edge of hole 27 precisely aligned with the plate parallel to the beam plates and passing through the knife edge E. This alignment is necessary in order that adjustment of the chain does not change equilibrium of the beam 1.

The present invention is also applicable to an extremely sensitive precision weighing scale S, parts of which are shown in FIG. 13. In place of beam 1 there is provided a scale arm 68 over which moves mass 69. This mass has an index and tightening screw 70. The movable mass 69 must have its center of mass in a plane which joins the edges of the knives 171, 172. The magnitude of mass 69 must be adequate to cover the range of weights or masses marked in graduations 68' on arm 68. The center of screw 73 is on the plane of the knife edges. The nuts 74 on screw 73 serve to adjust the level of the scale arm 68. On counterweight support 71 may be placed the balancing weights 72. Lever 177 contacting guide plate 9a is used to indicate the pressure applied by bearing plate 3b on knife 170 in the same manner as previously described in connection with lever 77. The post 89 supports the scale and load and a movable platform P to which bar 75 is operatively connected. This bar is attached to stirrup 18a suspended from knife 171. Counterweight support 71 is supported by stirrup 18b on knife 172 at the outer end of scale arm 68. The load on arm 68 is taken off the edge of center knife 170 by upward magnetic pull exerted by pole pieces 5b of which only one is shown. The pole pieces 5b are spaced from lower pole pieces by air gaps 6a. Magnetizing coils 8b are mounted on upper pole pieces 5b. The recording system of FIGS. 5, 6 and 12 can readily be applied to scale S. The scale S has the desirable advantage that loading and unloading is more readily done than for the balance B. Also since the balancing weight 72 is much smaller than the mass to be weighed on platform P the magnetic pull required for a given mass is about half as great as in balance B for the same size mass to be weighed. Also a smaller electromagnet system with smaller coils, pole pieces, etc. may be used, at a considerable saving in cost, lower power needs, etc. Oscillation damping electromagnet of balance B and central chain 32 may also be provided for scale S.

It will be apparent from the foregoing description that the invention employs a magnetic system to sustain low, medium and heavy loads with a minimum of elastic deformation of the supports, minimum weight and friction on the supports and minimum wear of the supports. This principle is specifically applied herein to utilization of a magnetic circuit to support the moving system of an extremely sensitive balance or scale for small, medium and heavy loads.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a weighing device, a balance beam, means for supporting a load at one end of the beam, means for supporting a mass at the other end of the beam, a knife carried by the beam, bearing means, said knife presenting a knife edge in contact with the bearing means at a balancing position of the beam, magnetic means supporting said bearing means and beam so that the knife edge is substantially relieved of the weight of said beam, said load and said mass, other magnetic means adjacent the beam for damping oscillations of the beam, and means operatively in contact with the bearing means for indicating extent of contact pressure between the bearing means and knife edge.

2. In a weighing device, a balance beam, means for supporting a load at one end of the beam, means for supporting a mass at the other end of the beam, a knife carried by the beam, bearing means, said knife presenting a knife edge in contact with the bearing means at a balancing position of the beam, magnetic means supporting said bearing means and beam so that the knife edge is substantially relieved of the weight of said beam, said load and said mass, other magnetic means adjacent the beam for damping oscillations of the beam, means operatively in contact with the bearing means for indicating extent of contact pressure between the bearing means and knife edge, and recording means connected to the beam and actuated by tilting movements thereof to record changes in said load with respect to said means.

3. In a weighing device, a knife having an upwardly pointing knife edge, first magnetic pole sections, a horizontally disposed beam secured at spaced positions thereof to said pole sections for support thereby, second magnetic pole sections disposed above and spaced from the first pole sections by air gaps, bearing means carried by the second pole sections for contacting the knife edge, said beam supporting said knife transversely of the beam between said spaced positions with the knife edge spaced from said bearing means, a frame assembly, means movably supporting the second pole sections on said frame assembly, current carrying coils on the second pole sections for magnetizing the first and second pole sections and drawing the first pole sections toward the second pole sections to elevate the beam and support the same with the knife edge lightly contacting said bearing means at a balancing position of the beam, load support means at one end of the beam, means for supporting a mass of known weight at the other end of the beam, a graduated scale carried by said frame assembly, and a needle carried by the beam and disposed in a plane including said knife edge, said needle intersecting the graduated scale, whereby said needle and scale indicate a balanced condition of the beam while carrying said load and mass at opposite ends while the second pole sections support substantially the entire weight of the beam, load, mass, and first pole sections.

4. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means.

5. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means, a lever pivotally carried by said frame assembly, said lever having one end operatively contacting the bearing means, and signal means operatively in contact with the other end of said lever for indicating contact pressure between said knife edge and bearing means.

6. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means, a lever pivotally carried by said frame assembly, said lever having one end operatively contacting the bearing means, signal means operatively in contact with the other end of said lever for indicating contact pressure between said knife edge and bearing means, and spring loaded means between the pivoted lever and bearing means for maintaining the air gap spacing therebetween under spring tension.

7. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contact said bearing means, a lever pivotally carried by said frame assembly, said lever having one end operatively contacting the bearing means, and signal means operatively in contact with the other end of said lever for indicating contact pressure between said knife edge and bearing means, a magnet carried by said frame assembly, and a plate carried by said beam at said magnet for damping oscillatory motions of the plate and beam while said load is being weighed.

8. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means, a lever pivotally carried by said frame assembly, said lever having one end operatively contacting the bearing means, and signal means operatively in contact with the other end of said lever for indicating contact pressure between said knife edge and bearing means, a magnet carried by said frame assembly, and a plate carried by said beam at said magnet for damping oscillatory motions of the plate and beam while said load is being weighed, a marking member carried by said beam, and a recording mechanism actuated by said marking member for making a continuous grapic record of change in weight of said load.

9. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means, a lever pivotally carried by said frame assembly, said lever having one end operatively contacting the bearing means, and signal means operatively in contact with the other end of said lever for indicating contact pressure between said knife edge and bearing means, an electric circuit connected to said coils for supplying said current thereto, relay means connected in said circuit and operatively connected to said beam for interrupting said circuit and cutting off said current if said beam is depressed by a force while said magnetic members are magnetized and while the knife edge is separated from said bearing means so that the knife edge is protected from damaging impact with the bearing means upon release of said force.

10. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means, a lever pivotally carried by said frame assembly, said lever having one end operatively contacting the bearing means, and signal means operatively in contact with the other end of said lever for indicating contact pressure between said knife edge and bearing means, an electric circuit connected to said coils for supplying said current thereto, relay means connected in said circuit and operatively connected to said beam for interrupting said circuit and cutting off said current if said beam is depressed by a force while said magnetic members are magnetized and while the knife edge is separated from said bearing means so that the knife edge is protected from damaging impact with the bearing means upon release of said force, and multiple rheostat means in parallel in said electric circuit for varying the magnitude of current without interruption in said coils to vary the magnetic pull of the second magnetic members on the first magnetic members.

11. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means, the means for supporting said load and for supporting said mass including other knives held in said beam by thermal compression, said other knives having upwardly pointed edges, stirrups for carrying the load and mass, and cylinders in said stirrups contacting the edges of the other knives.

12. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means, the means for supporting said load and for supporting said mass including other knives held in said beam by thermal compression, said other knives having upwardly pointed edges, stirrups having portions contacting the edges of the other knives, pans for carrying the load and mass respectively, rods connecting the pans and stirrups, and spring means at ends of the rods interposed between said ends of the rods and undersides of the pans for equally distributing weight of the load and mass on the pans.

13. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of the beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means, the means for supporting said load and for supporting said mass including other knives, the first named knife and the other knives being held in said beam by thermal compression.

14. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means, and a chain adjustably connected between said beam and said frame assembly, said chain being supported in a vertical plane including said knife edge for adjusting sensitiveness of the beam to small changes in weight of the load.

15. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means, the means for supporting said load and for supporting said mass including other knives, said beam including a pair of spaced parallel beam plates, tubular members between the beam plates, each of the knives extending through a different one of the tubular members and held therein by thermal compression, said knives extending longitudinally through holes in the beam plates, other plates between the beam plates, and screw means adjustably supporting the tubular members on the other plates so that the knives adjustably are positioned in the holes in the beam plates.

16. In a weighing device in combination, a knife having an upwardly pointing knife edge, first horizontally spaced magnetic circuit members, a horizontally disposed beam secured at horizontally spaced points thereof to said members, second horizontally spaced magnetic circuit members disposed above and spaced from the first members by air gaps, bearing means carried by second members, said bearing means including plates having notches for receiving said knife edge, a frame assembly, means adjustably supporting the second members on said frame assembly, means on the frame assembly for supporting the beam when in an unloaded condition, load support means at one end of beam, means for supporting a mass of known weight at the other end of the beam, current carrying coils on the second members for magnetizing the first and second members and drawing the first members toward the second members to elevate the beam and support the same with the knife edge lightly contacting said bearing means in said notches, and scale means carried by said frame assembly for indicating a balanced condition of the beam when the beam carries said load and weight while the magnetic circuit members are magnetized and while the knife edge lightly contacts said bearing means, a lever pivotally carried by said frame assembly, said lever having one end operatively contacting the bearing means, and signal means operatively in contact with the other end of said lever for indicating contact pressure between said knife edge and bearing means, a magnet carried by said frame assembly, and a plate carried by said beam at said magnet for damping oscillatory motions of the plate and beam while said load is being weighed, a marking member carried by said beam, and a recording mechanism actuated by said marking member for making a continuous graphic record of change in weight of said load, said recording mechanism including means for feeding a recording paper strip past a marking position, a marking tape at said marking position, a pressing bar adjacent the tape, a marking needle between the pressing bar and tape, said needle being supported by said beam, a solenoid having a plunger for actuating the pressing bar to move the needle against the paper with the tape therebetween, and an electric circuit including switch means for energizing the solenoid, whereby marks are made on said paper indicative of the weight of load carried by the beam when said switch means is closed.

17. The combination of claim 16, wherein said switch means includes a timer means for closing the switch periodically, and motor means for driving the paper continuously so that said marks are made on the paper at spaced time intervals.

References Cited

UNITED STATES PATENTS

| | | |
|---|---|---|
| 238,841 | 3/1881 | Brackett. |
| 1,629,221 | 5/1927 | MacNutt. |
| 2,407,513 | 9/1946 | Pounds. |
| 2,475,684 | 7/1949 | Weckerly. |
| 2,666,635 | 1/1954 | Holt. |
| 2,832,535 | 4/1958 | Sherman. |

RICHARD B. WILKINSON, *Primary Examiner.*

ROBERT S. WARD, *Assistant Examiner.*